No. 749,922. PATENTED JAN. 19, 1904.
J. W. DEÜBNER.
TIME RECORDER.
APPLICATION FILED SEPT. 15, 1900.
NO MODEL. 6 SHEETS—SHEET 1.

Fig. 1.

No. 749,922. PATENTED JAN. 19, 1904.
J. W. DEÜBNER.
TIME RECORDER.
APPLICATION FILED SEPT. 15, 1900.
NO MODEL. 6 SHEETS—SHEET 2.

Fig. 2.

Witnesses,

Inventor,
John W. Deübner,
By Offield Towle & Linthicum
Attys.

No. 749,922. PATENTED JAN. 19, 1904.
J. W. DEÜBNER.
TIME RECORDER.
APPLICATION FILED SEPT. 15, 1900.
NO MODEL. 6 SHEETS—SHEET 5.

No. 749,922. PATENTED JAN. 19, 1904.
J. W. DEÜBNER.
TIME RECORDER.
APPLICATION FILED SEPT. 15, 1900.
NO MODEL. 6 SHEETS—SHEET 6.

Witnesses,

Inventor,
John W. Deübner
By Offield Towle Linthicum
Atty's.

No. 749,922. Patented January 19, 1904.

UNITED STATES PATENT OFFICE.

JOHN W. DEÜBNER, OF CHICAGO, ILLINOIS, ASSIGNOR, BY MESNE ASSIGNMENTS, TO THE INTERNATIONAL TIME RECORDING COMPANY, A CORPORATION OF NEW JERSEY.

TIME-RECORDER.

SPECIFICATION forming part of Letters Patent No. 749,922, dated January 19, 1904.

Application filed September 15, 1900. Serial No. 30,087. (No model.)

*To all whom it may concern:*

Be it known that I, JOHN W. DEÜBNER, a citizen of the United States, residing at Chicago, in the county of Cook and State of Illinois, have invented certain new and useful Improvements in Time-Recorders, of which the following is a specification.

This invention relates to improvements in time-recorders for recording the individual time of each of a plurality of employees or for analogous purposes, and refers more specifically to a machine wherein a single set of clock-actuated recording devices is made shiftable relatively to a recording-sheet, so as to record the time of each of the several workmen in columns or lines respectively identified with the workmen.

Among the more salient objects of the present invention are to provide a simple practical machine of the character referred to adapted to record the time of a relatively large number of workmen for a given period of time in the form of a compact sheet, as distinguished from a recording-ribbon, whereon the several groups of figures or characters representing the time of each workman are arranged in columns, so that the totals or footings may be more readily made and the time-records of the entire body of workmen inspected without examining an unwieldy record-ribbon; to provide a novel paper-feeding mechanism whereby the recording-sheet will be fed forward step by step, not, however, upon every recording operation, but only at such times when it is necessary to feed it forward to prevent successive registrations from being printed upon each other; to provide an improved construction whereby the workman's time-record is immediately exposed to his view after the registration; to provide a mechanism for converting a practically continuous movement of one of the members of the clock mechanism into a step-by-step movement of one of the printing-forms and in such manner that the work to be done and friction to be overcome by the clock-movement will be as nearly constant as practicable, so that the time-keeping of the clock mechanism will be interfered with to the least possible extent; to provide a simple positive automatically-reversing inking mechanism; to provide an improved arrangement of parts whereby the several differently-identified printing positions will be spaced at relatively wide intervals apart, so that the workman may more readily and with less likelihood of mistakes bring the recording mechanism to register with his individual printing position and without unduly increasing the size of the machine; to provide an improved mechanism whereby the printing-forms are normally driven by the clock mechanism through the medium of a yielding connection, but so constructed that should the printing-form cease to move through the influence of the yielding connection it will eventually be moved positively or the clock mechanism stopped, and in general to simplify and improve the details of construction of a machine of the character referred to.

The invention consists in the matters hereinafter described, and more particularly pointed out in the appended claims, and will be readily understood from the following description, reference being had to the accompanying drawings, in which—

Referring to said drawings, within a suitable outer casing, comprising front and back walls 1 and 2, respectively, end walls 3, and a bottom wall 4, is arranged a suitable supporting-frame comprising a pair of skeleton side frame members 5 6, located adjacent to the respective sides of the outer casing and united rigidly to each other by means of a plurality of transversely-extending supports and bars, which constitute supports and ways for various parts of the recording mechanism, as well as cross-bars extending between the frames, as will be hereinafter more particularly described.

It is to be noted that in the machine shown herein the recording mechanisms are in duplicate, one mechanism being arranged vertically above the other, and in the following description the several parts will be described as though forming but a single machine, it being understood that the mechanisms are precisely similar throughout and are referred to by similar reference-figures, that certain parts are shown in the upper mechanism and omitted or not disclosed in the lower one, and vice versa. With this explanation in mind, 7 7 designate a pair of bars arranged to extend horizontally between the side frame members 5 6, parallel with each other and provided in their proximate faces with grooves or ways 8, with which is engaged a carriage-frame (designated as a whole 9) and adapted to be shifted laterally upon said ways throughout substantially the full width of the machine. As shown most clearly in Figs. 3 and 4, the carriage-frame comprises two similar side frame members 10 11 of skeleton form and united rigidly with each other by means of a plurality of cross-bars, as indicated at 12, 13, and 15, and a bottom plate 14 in parallel relation, each side frame member being provided at its upper end with a forwardly-projecting arm or extension 10' and 11', respectively, (see Figs. 2 and 4,) which pair of arms is arranged to project into a transversely-extending opening or slot 16 formed in the front wall of the casing. Between the ends of the forwardly-projecting arms is pivoted an operating-lever 17, whereby the carriage as a whole may be shifted manually to bring it opposite the several registering positions, said operating-lever consisting of a handle portion 18, which projects outside of the casing, and an inner lever portion 19, constituting one member of a toggle, by means of which the recording mechanism is actuated, as will be hereinafter more fully explained. As a preferred and convenient construction the cross-bar 15 constitutes the pivot or fulcrum upon which said operating-lever is mounted, the latter being held in position between the side frames 10 and 11 by means of a space-block 20, through which the cross-bar 15 extends and which is provided at its upper and lower sides with wings 21, which engage and slide within corresponding ways formed in that part of the casing which constitutes the upper and lower side walls of the slot 16 thereof.

Figure 1:
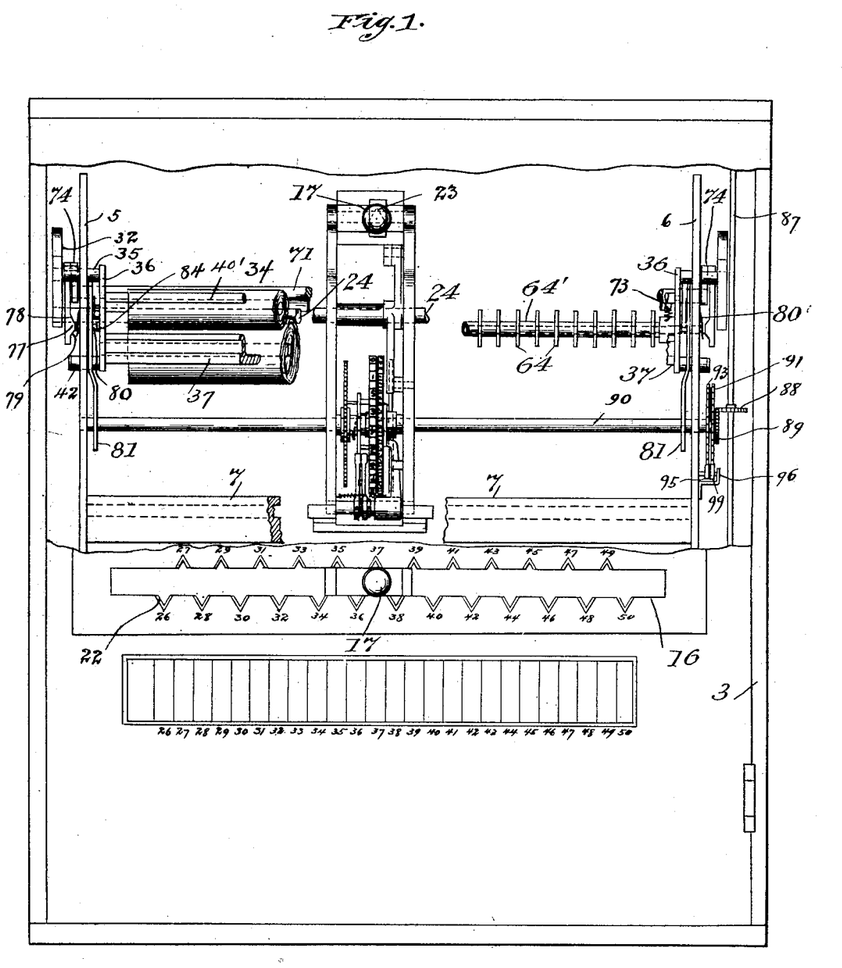
Figure 1 is a front elevation of a time-recorder embodying my invention, a part of the front casing being removed to expose mechanism and parts of the latter being broken away to expose other parts in rear thereof.

As will hereinafter appear, the recording operation may be performed by oscillating the lever 17 from a horizontal position either upwardly or downwardly, as the case may require, and in order to facilitate the adjustment of the carriage into exact register with the several printing-points along the slot 16 V-shaped notches or guides 22 are formed in said slot at the opposite sides thereof at points corresponding to the several printing positions, as best indicated in Fig. 1, and the upper and lower edges of the operating-lever adjacent to its fulcrum are made correspondingly beveled or knife-edged, as indicated in dotted lines at 23 in said Fig. 1, to engage said notches when the lever is oscillated. In order that the notches may be separated at intervals corresponding to twice the distance between adjacent printing positions, they are arranged alternately in the upper and lower sides of the slot in offset relation, as indicated clearly in the drawings.

Figure 2:
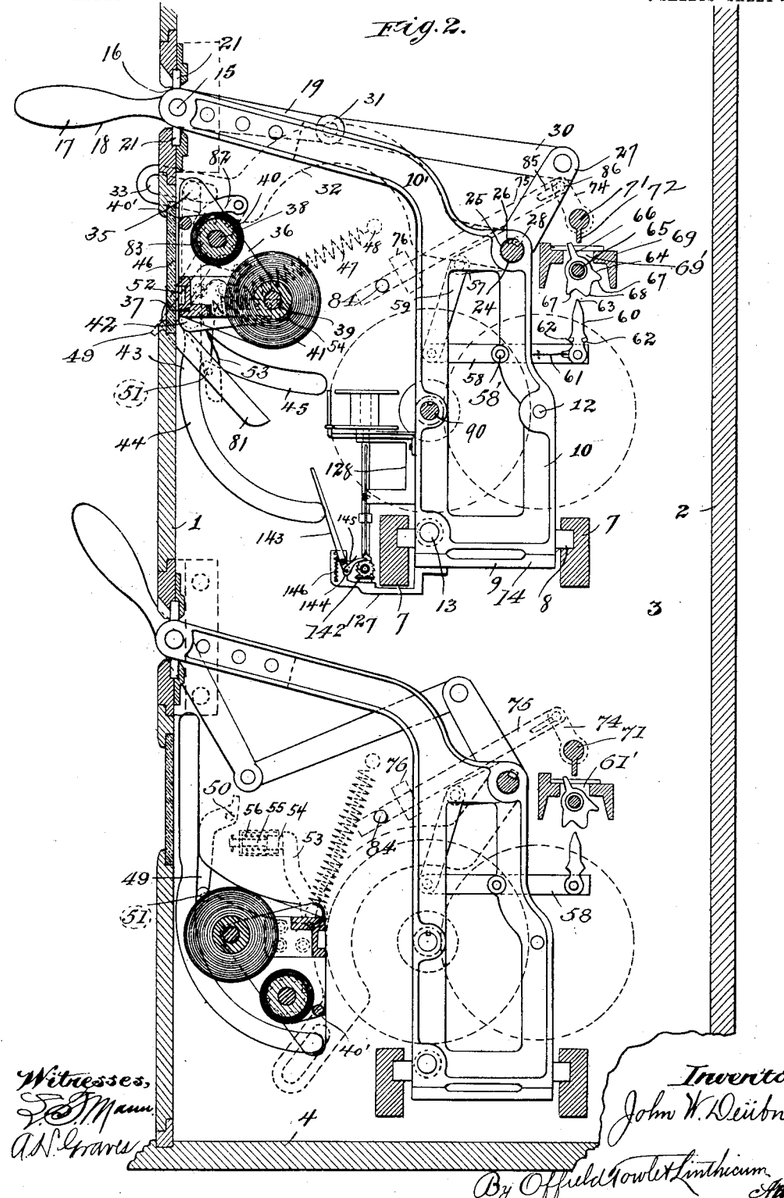
Fig. 2 is a transverse vertical sectional view showing the shiftable carriages in side elevation.
Figure 3:
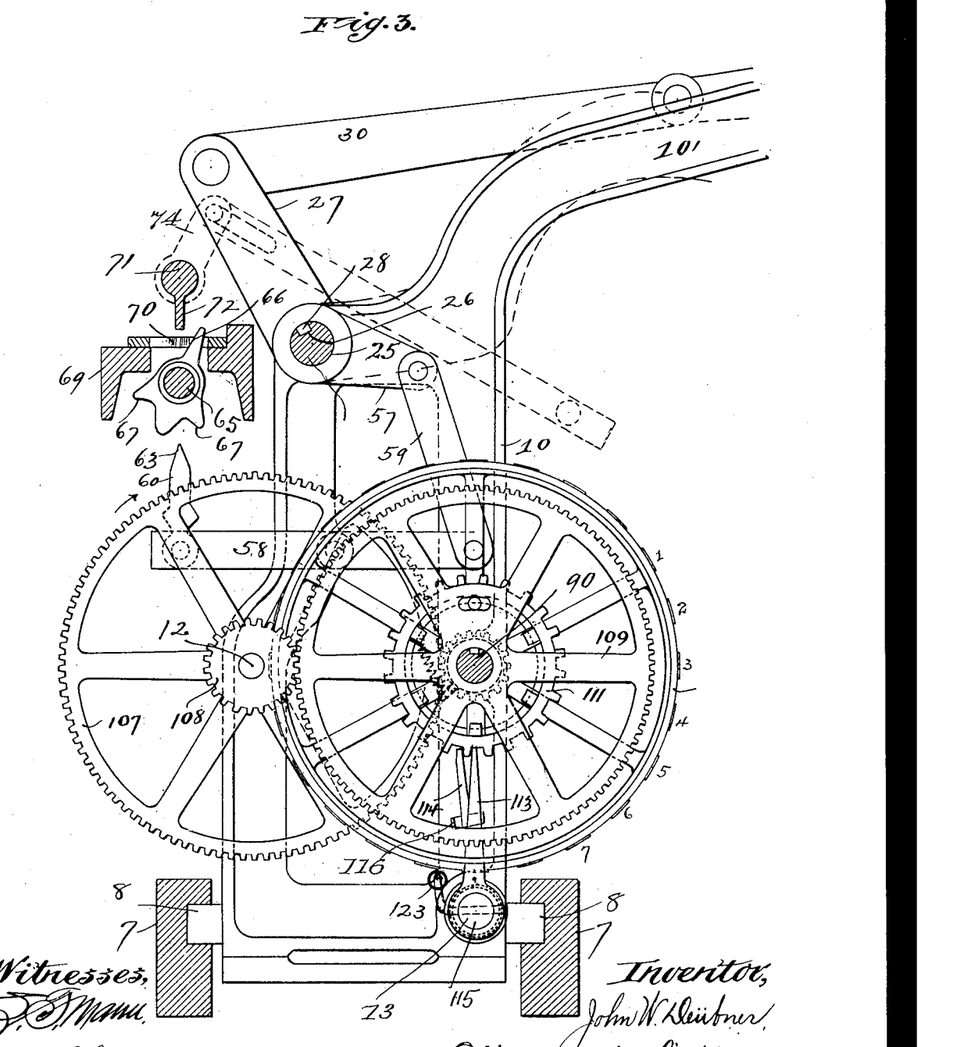
Fig. 3 is a view in side elevation of the principal portions of one of the shiftable carriages on a larger scale, the view being taken from a direction opposite that in Fig. 2.
Figures 4, 10:
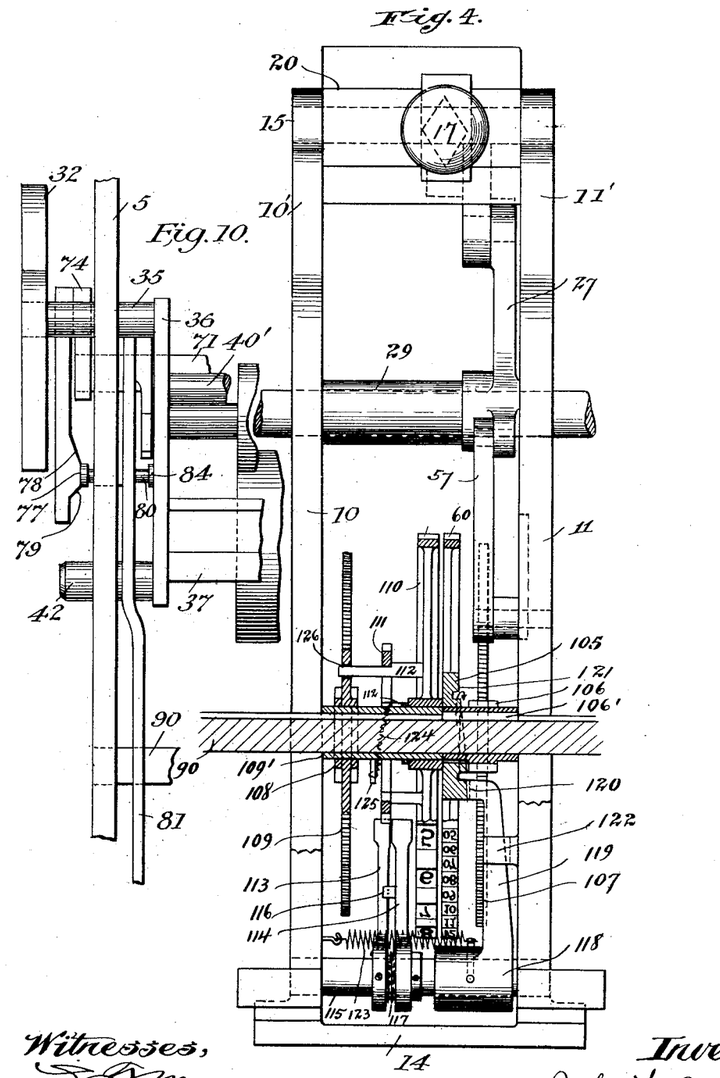
Fig. 4 is a front elevation of the parts shown in Fig. 3.
Fig. 10 is an enlarged detail of parts of paper-feeding mechanism.

24 designates a rock-bar mounted in suitable bearings in the end frames 5 6 of the machine and arranged to extend through suitable guide-apertures 25 in the upper rear portion of the shiftable carriage, as seen clearly in Figs. 2, 3, and 4, said rock-bar being provided with a keyway 26, extending throughout its length. Upon the rock-bar 24 at a point between the side frames of the carriage is mounted a lever 27, provided with a spline or key 28, which engages the keyway of the rock-bar, so as to be capable of oscillating the latter positively, while at the same time permitting the carriage to be freely shifted longitudinally of the rock-bar, said lever being held against lateral movement relatively to the frame members of the carriage by means of a space block or sleeve 29. The lever 27 is arranged to project upwardly from the rock-bar and is pivotally connected at its upper end with one end of a toggle-link 30, the opposite end of which is connected with the end of the operating-lever, as indicated at 31. Obviously by means of the above-described construction whenever the handle of the operating-lever is oscillated in either direction the lever-arm 27 will be drawn forwardly and the rock-bar correspondingly oscillated, the upward and downward movements of the operating-lever imparting exactly the same movement to the rock-bar.

Describing now the mechanism and connections whereby the oscillation of the rock-bar 24 in the manner hereinbefore described results in moving a recording-sheet carriage and the recording-sheet thereon into printing contact with the type-wheels carried by the shiftable carriage, feeds forward the recording-sheet at certain times, and exposes the impressions through a sight-aperture, it may first be noted that the operating mechanism, which derives movement from the said rock-bar, is duplicated at each end of the latter—*i. e.*, at each side of the machine—the object of this construction being to insure a more uniform action and to obviate any tendency of the parts to bind. It will of course be understood, however, that the mechanism at one end might be dispensed with, inasmuch as each side is complete in itself and capable of effecting all of the movements, especially in the case of a relatively narrow machine.

Referring now particularly to Figs. 1 and 2, upon each of the extreme ends of the rock-bar 24, at points outside of the side frame members 5 and 6, are keyed or otherwise rigidly secured forwardly-projecting and upwardly-arched carrier-arms 32, each provided at its forward end with a slot 33, which engages a stud 35 upon the end of a paper-carrier, (designated as a whole 34.) The paper-carrier 34 as preferably constructed and shown herein comprises two end plates 36, of generally triangular form, respectively arranged adjacent to the main side frames 5 and 6 and rigidly united with each other by means of a lower cross-bar 37 and shafts or round bars 38 and 39, the two latter bars constituting supports for the receiving-roller 40 and supply-roll 41, respectively, of the carrier. Each side frame 36 is provided with two outwardly-projecting studs, the stud 35, hereinbefore referred to, arranged at the upper angle of the side frame and a similar stud 42, arranged at the lower front angle of the side frame, both of said studs being arranged to project through a slot 43, formed through the main side frame member of irregular form, the upper portion thereof being straight and arranged vertically and the lower portion provided with two branched downwardly and rearwardly curved portions 44 and 45. The function of these slots 43 is to so guide the paper-carrier that as the latter is depressed by means of the carrier-arms 32 the carrier will be reversed, so that that side thereof which normally rests opposite a slight aperture 46, formed through the front casing, as indicated in the upper part of Fig. 2, will be carried into a position opposite and facing the front side of the type-wheels carried by the shiftable carrier, or, in other words, will be brought into a printing position, and, vice versa, when the carrier-arms are lifted will be returned to its normal position. To this end the slots are so shaped that as the carrier descends the lower pair of studs 42 thereof will be guided into the upper branches 45, and in the further descent of the carrier the upper pair of studs 35 will pass into engagement with the lower branches 44, and thus serve to reverse the carrier in the manner described. In order to insure that the several studs of the carrier-frame shall pass into proper engagement with the several branches of the slots, a coiled contractile spring 47 is arranged at each end thereof, one end of the spring being secured to the lower cross-bar 37 of the carrier and the opposite end to a stud 48 upon the side frame at a point above and in rear of the carrier in such manner that as the latter is depressed the lower pair of studs thereof will be drawn into the upper branches 45 of the slot. In order to prevent the upper guide-studs 35 from also entering the upper branches of the slot, pivoted latch-bars 49 are provided, mounted upon pivot-studs 50 upon the side frames in such position that they tend to drop down by gravity into position to close the upper entrance ends of the branch slots 45, and thus direct the upper pair of studs into the lower branches. Normally these latches 49 are held in partly-uplifted position, as indicated in the drawings, by engagement with the lower pair of studs 42, and their lower ends are arrested and held in position to properly guide the carriage as the latter descends by means of stops 51, mounted in the side frame in position to engage the lower ends of said latches.

The front side of the bar 37 of the paper-carrier, or that side which normally faces outward opposite the sight-aperture of the casing, constitutes the platen-bar of the carrier, which is brought into printing engagement with the type-wheels when the carrier is depressed in the manner hereinbefore described, the recording sheet or web, which is practically of the full width of the carrier, being extended from the supply-roll 41 forwardly under the said platen-bar, thence up in front of the latter to the receiving-roller, passing over a guide-bar 40' at the front. In order that the type characters upon the type-wheels may act against a yielding surface, so as to secure a more uniform and clear impression, the acting surface of the platen-bar is recessed, as indicated at 52, and provided with a filling-block of yieldable material, such as rubber or the like. When the carrier has been brought into printing engagement with the type-wheels, it will be obvious that the pressure of the carrier-arms acting thereon will tend to continue the rotary or reversing movement of the paper-carrier, the platen-bar, which is thus brought into contact with the type-wheels, forming a fulcrum-point upon which the carrier-frame would thereafter oscillate. In order to prevent the then upper side of the carrier from being thrown back away from the type-wheel before sufficient pressure is applied to secure a clear impression, the carrier-frame is provided at each end with a rigid arm 53, arranged to project therefrom in such position as to engage a yieldable resistance-block or buffer 54, mounted upon the side frame when the carrier is brought into printing position, this resistance-block being so located that the arm 53 will be brought into contact therewith shortly before the carrier-arms reach their lowermost position and before the studs engaged by said arms reach the ends of the guide-slots. In the preferred construction shown herein the resistance-block comprises a plunger 55, mounted in a suitable casing normally held projected by means of a coiled expansion-spring 56, located within said casing and acting upon the plunger.

Figure 9:
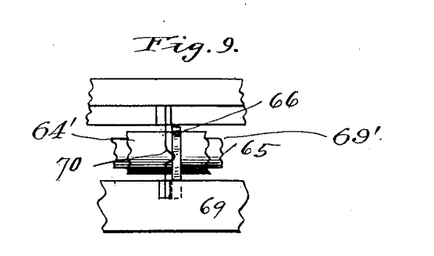
Fig. 9 is a detail of one of the shifters and adjacent parts.

One of the salient features of the present invention is the provision of a paper-feeding mechanism which while actuated simultaneously with the recording operation, so as to feed the paper forward step by step as required, is nevertheless so constructed and arranged that the paper will not be fed forward upon each recording operation, but only at such times as necessary in order to prevent successive impressions from being taken over each other upon the recording-sheet. To now describe the mechanism whereby this feature is carried out in the present instance, referring to Figs. 2 and 4, 57 designates a crank-arm mounted upon the rock-bar 24 within the shiftable carriage-frame, so as to oscillate positively with said rock-bar, said arm being in the present instance and desirably made integral with the arm 27 and arranged to project in an approximately horizontal forwardly direction when the parts are in their normal position. 58 designates a lever pivotally mounted between its ends upon the cross-bar 58', extending between the side frames of the shiftable carriage, and 59 a connecting-link connecting one end of said lever with the crank-arm 57. Upon the opposite end of the lever 58 is mounted a push-pawl 60, which is held yieldably in a vertically-upright position by means of a spring 61, which permits the pawl to oscillate in either direction, the extent of oscillation of the latter being limited by oblique shoulders 62, formed upon its opposite sides and offset laterally, so as to overhang and engage the upper edge of the lever upon which the pawl is mounted. The upper end of said pawl has the form of a transversely-extending blunt knife-edge 63, which is adapted to engage whichever one it is opposite of a series of shifters 64, which are severally mounted upon a supporting-bar 65, arranged to extend horizontally between the main side frame members of the machine directly above the path of movement of the said pawl as it moves with the shiftable carriage. The series of shifters 64 comprises one for each printing position of the machine, each being mounted so as to be capable of independent oscillatory movement on the bar 65 and each comprising an upwardly-projecting finger 66 and a pair of shoulders 67 upon its lower side adapted for engagement with the pawl 60 and separated by a V-shaped projection 68, the center of which is arranged diametrically opposite the finger 66, the construction and arrangement of the shifters being such with relation to the pawl 60 that when the latter is thrown upwardly by the oscillation of the lever 58 the pawl will be directed into engagement with whichever shoulder happens to be lowermost at that time and the shifter oscillated over into a position of opposite and similar angularity with reference to the pawl. As shown more clearly in detail, Fig. 9, each of said shifters consists of the body portion hereinbefore described and an integral sleeve portion 64', (see Fig. 1,) which serves as a space-block to properly separate the body portions and hold them from endwise movement upon the shaft or bar 65. In order that the oscillatory movement of one shifter may not be imparted to others adjacent thereto, a cross-bar 69 is mounted to extend transversely between the side frames adjacent to and overlying the series of shifters and provided with a longitudinally-extending slot 69', through which the upstanding fingers of the several shifters project. Upon the upper side of the said cross-bar 69 is mounted a series of plate-springs 70, (see Fig. 9,) one for each shifter, and each provided intermediate its length with a V-shaped portion projecting laterally into the path of the finger in its oscillatory movement, so that the shifter will be held yieldingly at its limit of movement in whichever position it happens to be thrown. 71 designates a rock-shaft mounted to extend parallel with and immediately above the supporting-shaft 65, which carries the shifters, said shaft 71 being provided with a depending flange 72, which extends downwardly into the paths of the fingers 66 of the shifters in their oscillatory movement back and forth, so that when any one of the shifters is oscillated in either direction it will engage and rock the rock-shaft throughout a certain arc, but will, however, pass out of engagement with the flange of the rock-shaft before the limit of movement of the shifter is reached. Means are provided for returning the rock-shaft to its normal position in which the flange thereof depends vertically downward, such means being herein shown as consisting of a spring 73, attached to one of the side frames and arranged to act upon the rock-shaft, as best indicated in Fig. 1. Upon each end of the rock-shaft 71 is rigidly mounted an arm 74, arranged in the present instance to project upwardly therefrom and engaging at its upper end a bar 75, arranged to extend obliquely downward and forwardly therefrom and mounted to reciprocate endwise in suitable ways or guides 76 upon the main side frame member. The lower end portion of the bar 75 is provided on its side next to the side frame member with a cam projection 77, (see Fig. 1,) having two oppositely-inclined surfaces 78 79, which are adapted to act upon a spring-pressed locking-pin 80, mounted in a suitable bearing in the side frame member, the arrangement being such that as the bar 75 is shifted endwise in either direction the locking-pin will be forced inwardly against the tension of its spring 80' and projected into the path of a member carried upon the paper-carrier frame and now to be described. The throw of the bar 75, however, is equal to the full width of the cam projection thereon, so that whichever direction it be shifted one or the other of the inclined surfaces will project the pin during the first part of the movement of the bar, and the oppositely-inclined cam-surface will thereafter permit the pin to be retracted in the further movement of the bar, unless the pin be engaged and held from retraction, as hereinafter described. Describing now the member which engages the locking-pin 80 and through the means of which the recording-sheet is fed forward, 81 designates a bent feed-lever pivotally mounted between its ends upon the bar 38, which supports the receiving-roll of the paper-carrier, and carrying at its upper end a pawl 82, arranged to act upon a ratchet 83, mounted upon the receiving-roll in such a manner as to rotate the latter positively when the bent lever 81 is oscillated. The lever 81 extends from the bar 38 obliquely downward and in front of the guide-stud 42 and is then deflected inwardly at an obtuse angle, its lower end being arranged to project in such a position as to engage the locking-pin 80 as the paper-carrier approaches the limit of its movement in its reversal into printing position whenever the said locking-pin is projected, but to pass by the latter when it is retracted. The inner projecting end of the locking-pin is provided with a head or overhanging portion 84, and the lower end of the lever 81 is so constructed as to engage the locking-pin behind said head, thus holding it from being retracted when the shifting-bar 75 is moved so as to carry the cam projection thereof out of engagement with the opposite end of the pin. The connection between the upstanding arm 74 of the rock-shaft 71 and the shiftable bar 75 is such as to afford a certain amount of lost motion, so that after the shiftable bar has been moved in one direction by the oscillation of one of the shifters in the manner hereinbefore described the flange of the rock-shaft will be free to return to its normal position without moving the bar in the opposite direction, such lost motion being shown as provided herein by means of an elongated slot 85, formed in the bar 75, which is engaged by a corresponding stud 86, carried by the arm 74. The result of this construction and arrangement is that whenever one of the shifters is oscillated in a given direction, so as to throw the cam-bar in one direction, the oscillation of any number of other shifters successively in the same direction will have no operative effect upon the cam-bar, the rock-shaft 71 being simply oscillated idly and returning to its normal position each time. As soon, however, as any one of the series of shifters is oscillated in the opposite direction, the cam-bar will be shifted to its opposite limit of movement and will thereafter remain in this position until returned by the oscillation of a shifter in an opposite direction. It follows therefore that the cam-bar 75 will only be operated to engage the bent lever 81 and feed forward the paper upon such recording operations as serve to oscillate a shifter in a direction oppositely from that of the preceding shifters, so that it may and usually will happen that the entire number of workmen will register without shifting the recording-sheet but once, the first workman to register "In," for example, shifting the sheet, and all of the succeeding workmen registering "In" recording upon the same horizontal line of the recording-sheet, or, in other words, without shifting the sheet. Vice versa, the first workman registering "Out" will again shift the recording-sheet, and the succeeding registrations in the same direction will follow in the same horizontal line.

Figure 5:
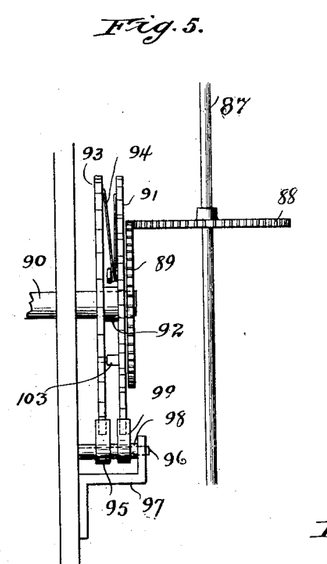
Figs. 5, 6, and 7 are detailed views of the mechanism whereby the movement of a continuously-rotating shaft operated by the clock mechanism is communicated to the printing-forms and converted into a step-by-step movement in such transmission.
Figure 6:
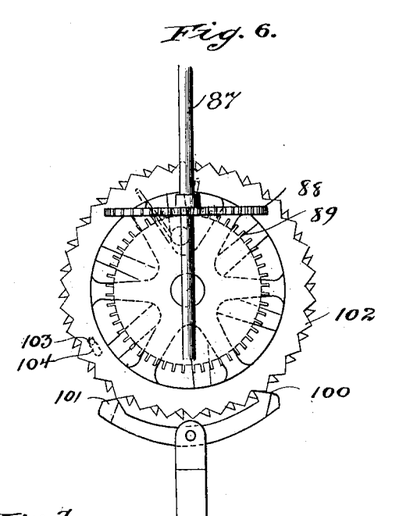
Figure 7:
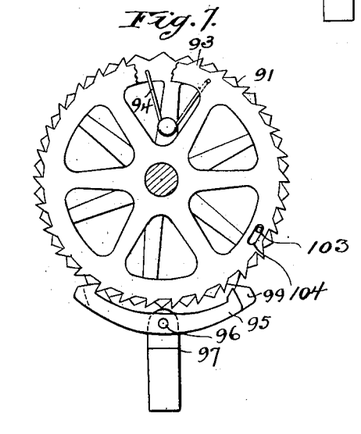

To now describe the printing-forms and the mechanism whereby the latter are actuated from any suitable clock-actuated or clock-controlled mechanism, 87 designates a vertically-arranged shaft, one end of which—as, for example, the upper end—is designed to be connected with any suitable or ordinary clock-movement, so that it will be rotated continuously and preferably at the rate of one complete revolution each hour. Upon the shaft 87 is mounted a driving-pinion 88 for each of the two registers, said pinions being arranged to intermesh directly with spur wheels or gears 89, mounted upon the adjacent ends of main driving-shafts 90, arranged to extend through suitable bearings in the main side frame members of the recorder and so located as to extend through the front portions of the shiftable carriages 9. The pinion 89 (see detail Figs. 5, 6, and 7) is not, however, mounted rigidly upon the shaft 90, but is, together with a cam-wheel 91, arranged immediately adjacent to said pinion, mounted rigidly upon a sleeve 92, which is rotatably mounted upon the shaft 90, and adjacent to the inner end of said sleeve is mounted an escapement-wheel 93, which is yieldably connected, so as to move with the cam-wheel and pinion by means of a V-shaped spring 94, interposed between the cam and escapement wheels and having its arms respectively connected to the latter. The escapement-wheel 93 is mounted rigidly upon the shaft 90, and in order to convert the continuous rotary movement of the cam-wheel 91 into a step-by-step movement of the escapement-wheel 93 and main shaft controlled thereby a vibrator or verge 95 is mounted adjacent to and in position to control the escapement-wheel conveniently and, as herein shown, upon a bearing-stud 96, one end of which is seated in the main side frame and the opposite end of which is carried by a bracket 97, and upon this same bearing-stud and united rigidly to the vibrator by means of a sleeve 98 is mounted a cam-rocker 99, provided at each end with a V-shaped cam projection, as 100 101, bearing such relation to the cam projections 102 of the cam-wheel as to be rocked or oscillated positively in both directions by the latter in a familiar manner. The result of this construction is that as the cam-wheel is moved forward continuously the verge will hold the escapement-wheel from movement until the rocker has completed the oscillation of the escapement in one direction, whereupon the tension of the V-spring uniting the cam and escapement wheel will step the latter forward one tooth, and in the same manner when the escapement has been oscillated in the opposite direction by the cam-rocker the escapement-wheel will again follow the cam-wheel a step. In order that the escapement-wheel shall be moved positively with the cam-wheel after the latter has moved forward one step in case the V-spring should fail to carry it forward when released by the escapement, the cam-wheel is provided with a stud 103, which is arranged to project through an arc-shaped slot 104 in the escapement-wheel, and the forward end of which is so located as to be brought into bearing with the stud in case the cam-wheel be moved forward more than one step ahead of the escapement-wheel.

The main driving-shaft 90 is provided with a keyway extending throughout its length in order that the printing-forms carried by the shiftable carriage may have continuous driving engagement therewith, while at the same time capable of being shifted endwise of the shaft to any desired position.

105 designates the minute-wheel, which is rigidly mounted upon or connected with the hub portion of a gear 106, (see Figs. 3 and 4,) located between the side frame members of the shiftable carriage, the hub of said gear 106 being provided with a key or feather 106', which engages the keyway of the shaft.

107 designates a reducing-gear mounted upon a suitable bearing-shaft in the rear part of the carriage-frame and arranged to intermesh with the gear 106. The gear 107 is mounted rigidly upon its shaft, which latter carries adjacent to its opposite end a second reducing-gear 108, which is in turn arranged to intermesh with a third gear 109, mounted rigidly upon a sleeve 109', which rotates loosely upon the main driving-shaft and is desirably and, as shown herein, of sufficient length to form a spacing-sleeve which serves to hold the gear 106 and the minute-wheel connected therewith from lateral movement upon the side frames. Upon the end of the sleeve 109' adjacent to the minute type-wheel, is mounted an hour type-wheel 110, preferably, and, as herein shown, provided with two series of figures or characters running from "1" to "12" and repeated, so that the wheel may be revolved only once in twenty-four hours and the a. m. and p. m. periods properly indicated thereon. Inasmuch as the minute type-wheel is actuated step by step once each minute, as hereinbefore described, it follows that the train of gears connected therewith imparts to the gear 109 a practically continuous movement, and in order that this substantially continuous movement may be transformed into a step-by-step movement of the hour type-wheel at the end of each hour means are provided as follows:

111 designates a ratchet-wheel rim mounted concentrically with and carried by means of a plurality of arms 112 upon the hour type-wheel, said ratchet-wheel being located between the gear 109 and the hour type-wheel.

113 114 designate a pair of escapement-dogs which are arranged to control the ratchet-wheel 111, said dogs being mounted upon a transversely-extending shaft 115, mounted in the carriage-frame vertically beneath and parallel with the main shaft 90, so as to be capable of endwise movement within said bearings. The controlling-dog 113 is made rigid with the shaft 115 and arranged to project upwardly in position to engage at its upper end with the ratchet-wheel, while the controlling-dog 114 is loosely mounted upon the said shaft adjacent to the rigid dog and is capable of a limited oscillatory movement equal in extent to the distance from one ratchet-notch to the next of the ratchet-wheel, the extent of its movement being limited by means of a yoke 116, connected therewith and embracing the adjacent rigid dog, as indicated clearly in Figs. 3 and 4. The loosely-mounted controlling-dog is held yieldably in the same vertical plane with the rigid dog by means of a coiled spring 117 acting thereon.

118 designates a cam-wiper mounted rigidly upon the shaft 115 adjacent to the minute type-wheel and having an upstanding arm 119, provided at its end with a bearing portion 120, which is arranged to engage a spirally-formed cam-surface 121, formed concentrically with the axis of and upon the minute type-wheel, said cam-surface consisting of a uniform incline extending entirely around the cam portion and an abrupt drop between the higher and lower portions of the incline. The wiper 118 is held from rotary movement by means of a pair of parallel guide-lugs 122, projecting inwardly from the adjacent side frame member 11 of the carriage and embracing the opposite sides of the wiper-arm, and in order that the wiper, together with the shaft 115 and parts mounted thereon, may be held in operative engagement with the said cam a contractile spring 123 is connected at one end with the side frame member 10 and at its opposite end with the wiper in such manner as to tend to hold the latter in bearing engagement.

124 designates a coiled contractile spring connected at one end with a stud 125 upon the sleeve 109', which is rigid with the gear 109 and united at its opposite end with one of the arms 112, which carry the ratchet-wheel, the arrangement of this spring being such as to cause the hour type-wheel to rotate with the said gear 109, and it is to be noted in this connection that the spring 124 is of sufficient strength to readily overcome the tension of the spring 117, which acts upon the removable controlling-dog 114. In order that the hour-wheel may be moved positively with the said gear 109 after the latter has advanced more than one step ahead of the hour-wheel in case the latter should fail to be moved by the spring 124, one of the arms 112 is extended beyond the ratchet-wheel and arranged to project through a slot 126, formed in the gear 109, the back end of said slot being so located as to engage the arm and carry the latter with it positively in case the gear should be rotated more than the angular distance between the ratchet-notches of the ratchet-wheel without the hour-wheel following up.

Figure 8:
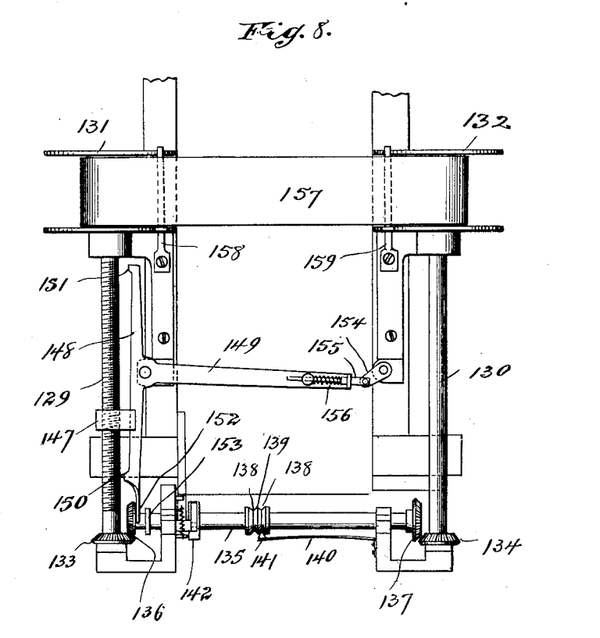
Fig. 8 is a front elevation of the ribbon-feeding mechanism.

Describing now the inking-ribbon mechanism, 127 and 128 designate bracket-frames mounted upon the lower front portion of the shiftable carriage-frame and constituting supports upon which the ribbon mechanism is mounted. (See Figs. 2 and 8.)

129 130 designate parallel vertically-arranged spool-shafts mounted in suitable bearings upon the said bracket-frames, each being provided at its upper end with a ribbon-spool, as 131 132, and at its lower end with a beveled gear, as 133 134.

135 designates a drive-shaft mounted in suitable bearings to extend transversely between the spool-shafts and capable of being shifted endwise to a limited extent. Upon each end of said drive-shaft is rigidly mounted a beveled gear 136 137, respectively adapted to alternately intermesh with the gears 133 134, and in order to hold said gears yieldingly in mesh with whichever spool-shaft toward which it happens to be shifted said drive-shaft is provided at a point intermediate its length with a pair of circumferential grooves 138, separated by a circumferential rib 139. 140 designates a spring, provided at its end with a cam projection 141, adapted to engage said grooves and hold the shaft yieldingly in one position or the other, the rib 139 being V-shaped in cross-section, so that the shaft may be shifted endwise, notwithstanding the engagement of the spring-pressed cam projection.

142 designates a ratchet-wheel mounted upon the drive-shaft, and 143 a lever pivotally supported at one end upon a pivot-stud 144 upon the frame member adjacent to the ratchet-wheel and projecting at its upper free end into the path of the guide-bar 40' of the paper-carriage, so as to be oscillated thereby when the carriage is brought into printing position. Upon the lever 143 is mounted a pawl 145, adapted to engage and operate the ratchet-wheel when the lever returns to be oscillated by the paper-carriage, and in order to thus return the lever a spring 146 is arranged to act thereon, as indicated clearly in Figs. 2 and 8.

By means of the foregoing construction it will be obvious that the drive-shaft will be rotated a step each time the workman registers, and in order that the ribbon may be automatically reversed at the end of a given number of revolutions of the ribbon-spool means are provided as follows:

One of the spool-shafts—as, for example, that designated 129—is screw-threaded throughout its principal length, and a nut 147 is mounted to travel thereon.

148 designates a reversing-bar pivotally mounted at the intersection of its arms adjacent to the threaded spool-shaft, so that its head portion extends approximately parallel with the said shaft, while its stem or other arm 149 extends at right angles thereto. The proximate side of the nut 147 is provided with a slot or recess which engages the edge of the reversing-bar and prevents the nut from rotation, while permitting it to travel freely from end to end of the bar, and adjacent to each end of this portion of the bar are formed inclined and divergent projections 150 151, which as the nut is carried into engagement therewith serve to oscillate the reversing-lever positively in one direction or the other. One end of the head member of the reversing-lever is extended and provided with a yoke-shaped nut 152, which embraces the driving-shaft at a point between the gear 136 and a fixed collar 153, so that as the reversing-lever is oscillated by the engagement of the traveling nut with its cam projections the drive-shaft will be positively shifted in one direction or the other, thus throwing it out of mesh with one spool-shaft and into mesh with the other one. In order to insure that the drive-shaft shall be held at the extreme limit of its movement in each direction—*i. e.*, in full mesh with the several gears of the spool-shafts—the arm 149 of the reversing-lever is connected at its end with a spring-flexed toggle comprising a toggle-arm 154, pivotally connected at one end with the supporting-frame and at its opposite end with a spring-projected extension 155, mounted and guided upon the end of the arm 149, the arrangement of the parts being such that an expansion-spring 156 tends to hold said extension projected, and therefore flexed, as far as permitted by the movement of the other arms of the reversing-lever. In order that the ribbon 157 may be guided and held in suitable relation to the type-wheels, guide-fingers 158 159 are arranged to extend outwardly from the ribbon-frame, at the opposite sides thereof, the guide portions of said fingers being arranged parallel with each other and approximately in a plane with the printing portions of the type-wheels, as indicated clearly in the drawings.

The operation of the machine constructed as above described has been clearly indicated in connection with the description of the several features of mechanism and need not, therefore, be repeated at length.

While I have herein shown and described what I deem to be a preferred embodiment of my invention, yet it is to be understood that the details thereof may be modified, and I do not, therefore, wish to be limited to the details of construction shown and described, except as they are made the subject of specific claims.

I claim as my invention—

1. In a time-recorder, the combination of a clock-actuated printing-form, a sheet-supporting mechanism, means for shifting one of said mechanisms relatively to the other to cause the printing-form to traverse the recording-sheet, manually-operable means for taking an impression from the printing-form upon the recording-sheet, adapted for operation when said parts are shifted into various relations relatively to each other, and means acting automatically to feed one of said mechanisms a step forward relatively to the other in a direction transversely to the direction in which said other part is shifted manually.

2. In a time-recorder, the combination of a clock-actuated printing-form, a sheet-supporting mechanism, means for shifting one of said mechanisms relatively to the other to cause the printing-form to traverse the recording-sheet, manually-operable means for taking an impression from the printing-form upon the recording-sheet, adapted for impression when said parts are shifted into various relations relatively to each other, corresponding to the several registering positions, and means acting automatically to feed one of said mechanisms a step forward relatively to the other in a direction transversely to the direction in which said other part is shifted manually, said mechanism comprising a shifting mechanism which automatically reverses itself each time it operates effectively, so as to act idly upon successive registrations in the same direction after the first, as and for the purposes set forth.

3. A time-recording machine comprising a form bearing time-indicating characters, adapted to be actuated by a clock mechanism having constant driving engagement with said form, manually-operable means for shifting said form to traverse it across a recording-sheet, manually-operable means for taking an impression from the form upon the recording-sheet, operable when said form is shifted into various positions relatively to said sheet and mechanism operating to feed the sheet forward a step at a time, said mechanism comprising a plurality of individual shifters respectively corresponding to the several printing positions, each adapted to be shifted alternately in opposite directions when successively recording operations are performed, and a paper-feeding mechanism proper having a part common to all of said shifters, and adapted to be acted upon whenever one of the latter is shifted in a direction the reverse of that of the last preceding shift.

4. In combination with a workman's time-recorder comprising clock-controlled printing mechanism and mechanism for taking impressions therefrom, an oscillatory lever having operative connection with said impression mechanism and adapted to be shifted manually back and forth along ways to bring it into register with various printing positions, said lever being mounted to oscillate transversely to the direction in which it is shifted manually, and its operative connections with the impression mechanism being such as to operate the latter when the lever is oscillated in either direction from a position located intermediate of the limits of its throw.

5. In combination with a workman's time-recorder comprising clock-controlled printing mechanism and an impression mechanism for taking impressions therefrom, of an oscillatory lever having operative connections with said impression mechanism, a guide-slot along which said lever is adapted to be shifted manually, and indicating-marks arranged at intervals along said guide-slots at each side thereof indicating the several printing positions, said oscillatory lever being mounted to oscillate in a direction transversely to the length of the guide-slot, and its operative connections with the impression mechanism being arranged to operate the latter when the oscillatory lever is oscillated toward either side of the guide-slot, as and for the purposes set forth.

6. In combination with a workman's time-recorder comprising clock-controlled printing mechanism and an impression mechanism for taking impressions therefrom, of an oscillatory lever having operative connections with said impression mechanism, a guide-slot along which said lever is adapted to be shifted manually, a plurality of notches formed in the opposite sides of said slot and constituting guides and indicating-marks designating the several printing positions, and guide projections upon the opposite sides of said oscillatory lever adapted to coöperate with said guide-notches, said oscillatory lever being mounted to oscillate in a direction transversely to the length of the guide-slot, and its operative connections with the impression mechanism being arranged to operate the latter when the oscillatory lever is oscillated toward either side of the guide-slot, as and for the purposes set forth.

7. In combination with a workman's time-recorder, comprising clock-controlled printing mechanism and an impression mechanism for taking impressions therefrom of an oscillatory lever having operative connections with said impression mechanism, a guide-slot along which said lever is adapted to be shifted manually, a plurality of notches formed in the opposite sides of said slot in offset relation to each other and constituting guides and indicating-marks designating the several printing positions, and guide projections upon the opposite sides of said oscillatory lever adapted to coöperate with said guide-notches, said oscillatory lever being mounted to oscillate in a direction transversely to the length of the guide-slot, and its operative connections with the impression mechanism being arranged to operate the latter when the oscillatory lever is oscillated toward either side of the guide-slot, as and for the purposes set forth.

8. In a time-recorder, the combination with a suitable frame, of a set of printing-forms mounted to reciprocate upon ways within said frame and adapted to be actuated by a clock mechanism having constant driving engagement with said printing-forms, a sheet-supporting impression-carriage of a width equal to the length of travel of the printing-forms along said ways and adapted to be brought into printing engagement with the printing-forms while the latter are in various positions, and an operating-lever connected to and moving with said printing-forms and having constant operative engagement with the impression-carriage, whereby the latter may be operated when the forms are shifted to another position, substantially as described.

9. In a time-recorder, the combination with a suitable frame, of a set of printing-forms mounted to reciprocate upon ways within said frame and adapted to be actuated by a clock mechanism having constant driving engagement with said printing-forms, a sheet-supporting impression-carriage of a width equal to the length of travel of the printing-forms along said ways and adapted to be brought into printing engagement with the printing-forms while the latter are in various positions, an operating-lever connected to and moving with said printing-forms and having constant operative engagement with the impression-carriage, whereby the latter may be operated when the forms are shifted to another position, a sheet-feeding mechanism and an operating member moving with the printing-forms and capable of acting upon said sheet-feeding mechanism to operate the latter in each of the printing positions to which the printing-forms may be shifted, as and for the purposes described.

10. In a time-recorder, the combination with a suitable frame, of a set of printing-forms mounted to reciprocate upon ways within said frame adapted to be actuated by a clock mechanism having constant driving engagement with said printing-forms, a sheet-supporting impression-carriage of a width equal to the length of travel of the printing-forms along said ways and adapted to be brought into printing engagement with the printing-forms while the latter are in various positions, an operative lever connected to and moving with said printing-forms and having constant operative engagement with the impression-carriage, whereby the latter may be operated when the forms are shifted to another position, a sheet-feeding mechanism and an operating member moving with the printing-forms and capable of acting upon said sheet-feeding mechanism to operate the latter in each of the printing positions to which the printing-forms may be shifted, said sheet-feeding mechanism comprising a plurality of individual shifters respectively corresponding to the several printing positions, each adapted to be shifted alternately in opposite directions when successive recording operations are performed, and adapted to be severally acted upon by the operating member moving with the printing-forms, as and for the purposes described.

11. In a time-recorder, the combination with a suitable casing, of a printing-form carriage mounted to reciprocate on ways within said casing and carrying a set of clock-controlled printing-forms, an operating-lever connected with said printing-form carriage and extending out through a slot in the casing, whereby the printing-carriage may be shifted manually, a sheet-supporting impression-carriage of a width equal to the length of travel of the printing-form carriage upon said ways and movably mounted within the casing so as to be capable of being brought into printing contact with said printing-forms, operative connections between the operating-lever and said impression-carriage, comprising a rock-shaft, an arm rigidly mounted upon said rock-shaft and engaging the printing-carriage, and operative connections between the rock-shaft and operating-lever, whereby the latter is free to be shifted longitudinally of the rock-shaft while retaining driving connection therewith, a series of oscillatory shifters mounted adjacent to the path of said printing-form carriage and an oscillatory lever mounted upon the printing-form carriage, having constant driving engagement with the operating-lever, and carrying a pawl adapted to act upon said shifters, a rock-shaft provided with a flange adapted to be acted upon by said shifters, and a paper-feeding mechanism adapted to be brought into operation by the oscillation of the last-mentioned rock-shaft, substantially as described.

12. In combination with a shiftable carriage, an operating-pawl carried thereby, a series of independently-operable shifters, one for each printing position, pivotally supported adjacent to the path of movement of the shiftable carriage, each shifter comprising a pair of pawl-engaging shoulders separated angularly from each other and an engaging projection, a rock-shaft mounted adjacent to the series of shifters and provided with means adapted to be engaged by the projections of the shifters, and a paper-feeding mechanism adapted to be brought into operation by the oscillation of the rock-shaft through the medium of either of said shifters, as and for the purposes set forth.

13. In combination with a shiftable carriage and an operating-pawl carried thereby, a series of independently-operable shifters, one for each printing position, pivotally supported adjacent to the path of movement of the shiftable carriage, each shifter comprising a pair of pawl-engaging shoulders separated angularly from each other and an engaging projection, a rock-shaft mounted adjacent to the series of shifters and provided with means adapted to be engaged by the projections of the shifters, an arm mounted upon said rock-shaft, a reciprocatory member connected with and operable by said arm, the connections between said reciprocatory member and rock-shaft being constructed to afford lost motion, and a paper-feeding mechanism adapted to be thrown into operation by the shifting of the reciprocatory member.

14. In combination with a shiftable carriage and an operating-pawl carried thereby, a series of independently-operable shifters, one for each printing position, pivotally supported adjacent to the path of movement of the shiftable carriage, each shifter comprising a pair of pawl-engaging shoulders separated angularly from each other and an engaging projection, a rock-shaft mounted adjacent to the series of shifters and provided with means adapted to be engaged by the projections of the shifters, an arm mounted upon said rock-shaft, a reciprocatory member connected with and operable by said arm, the connections between said reciprocatory member and rock-shaft being constructed to afford lost motion, and a paper-feeding mechanism adapted to be thrown into operation each time the reciprocatory member is shifted in either direction.

15. In a time-recorder, the combination with printing-forms and a movable paper-carriage adapted to be brought into printing contact with said printing-forms, of a paper-feeding mechanism comprising a feed-roll, a ratchet operatively connected with said feed-roll, an actuating-pawl and a lever all carried by the paper-carriage, and means for operating said paper-feeding mechanism, comprising a projectible stop and a cam for operating said stop to throw it into the path of the operating-lever of the paper-feeding mechanism when the paper-carriage is carried into printing contact, said cam being connected with and operated by a part of the impression mechanism which is actuated only when a reversal in the direction of recording occurs, substantially as described.

16. In a time-recorder, the combination with printing-forms and a movable paper-carriage adapted to be brought into printing contact with said printing-forms, of a paper-feeding mechanism comprising a feed-roll, an actuating-pawl and a lever all carried by the paper-carriage, and means for operating said paper-feeding mechanism comprising a spring-retracted projectible stop, and a shiftable bar or member provided with oppositely-inclined cam-surfaces adapted to project said stop when the shiftable member is reciprocated in either direction, substantially as described.

17. In a time-recorder, the combination with printing-forms and a movable paper-carriage adapted to be brought into printing contact with said printing-forms, of a paper-feeding mechanism comprising a feed-roll, an actuating-pawl and a lever all carried by the paper-carriage, and means for operating said paper-feeding mechanism comprising a spring-retracted projectible stop having an engaging projection adapted to engage the operating-lever of the paper-feeding mechanism and hold said stop from retraction, and a shiftable bar or member provided with oppositely-inclined cam-surfaces adapted to project said stop when the shiftable member is reciprocated in either direction, substantially as described.

18. In combination with a pivotally-mounted oscillatory shifter having two pawl-engaging shoulders separated angularly from each other, a pivotally-mounted operating-pawl movably supported to approach said shifter in a direction substantially radial to the pivotal axis of the latter and means holding said pawl yieldably in a position substantially in alinement with its path of approach to the shifter, substantially as and for the purposes set forth.

19. In combination with a paper-carriage having an impression-surface adapted to be moved bodily to bring it into engagement with a printing-form, a feed-ratchet carried by said carriage, a lever operatively connected with said feed-ratchet and a movable stop adapted to be thrown into position to engage said lever to effect the feeding of the paper when the carriage is moved to effect the impression.

20. In a time-recorder, the combination with a continuously-moving clock-controlled shaft, of means for converting the continuous movement of said shaft into an intermittent step-by-step movement comprising a gear upon the clock-controlled shaft, a second gear loosely mounted adjacent to and meshing with the gear of the clock-controlled shaft, a cam-wheel operatively connected to move with the driven gear, a cam-pallet arranged to coöperate with the cam-wheel, a driven shaft, an escapement-wheel non-rotatably mounted upon said driven shaft concentric with the cam-wheel, an escapement-pallet connected to and moving with the cam-pallet and arranged to control said escapement-wheel, and a yielding connection between the cam and escapement wheels, substantially as described.

21. In a time-recorder, the combination with a continuously-moving clock-controlled shaft, of means for converting the continuous movement of said shaft into an intermittent step-by-step movement comprising a gear upon the clock-controlled shaft, a second gear loosely mounted adjacent to and meshing with the gear of the clock-controlled shaft, a cam-wheel operatively connected to move with the driven gear, a cam-pallet arranged to coöperate with the cam-wheel and positively actuated in both directions by the latter, a driven shaft, an escapement-wheel non-rotatably mounted upon said driven shaft concentric with the cam-wheel, an escapement-pallet connected to and moving with the cam-pallet and arranged to control said escapement-wheel, and a yielding connection between the cam and escapement wheels, substantially as described.

22. In a time-recorder, the combination with a continuously-moving clock-controlled shaft, of means for converting the continuous movement of said shaft into an intermittent step-by-step movement comprising a gear upon the clock-controlled shaft, a second gear loosely mounted adjacent to and meshing with the gear of the clock-controlled shaft, a cam-wheel operatively connected to move with the driven gear, a cam-pallet arranged to coöperate with the cam-wheel, a driven shaft, an escapement-wheel non-rotatably mounted upon said driven shaft concentric with the cam-wheel, an escapement-pallet connected to and moving with the cam-pallet and arranged to control said escapement-wheel, a yielding connection between the cam and escapement wheels, a rigid stud projecting from the cam-wheel, and a fixed stop upon the escapement-wheel arranged in the path of movement of the rigid stud and adapted to be engaged by the latter so as to move the escapement-wheel positively with the cam-wheel when the latter advances an angular distance ahead of the escapement-wheel greater than the distance between successive teeth of the ratchet-wheel, as and for the purpose set forth.

23. In combination with a substantially continuously rotating driven member, means for imparting an intermittent step-by-step movement therefrom, comprising a second member mounted to rotate upon an axis concentric with the axis of rotation of the drive member, a spring yieldably connecting said members so that the driven member tends to move with the drive member, a ratchet-wheel connected to move positively with the driven member, a pair of ratchet-dogs, one fixed relatively to the forward movement of the ratchet-wheel and the other yieldable between fixed stops, limiting its movement to a distance corresponding to the distance between ratchet-teeth, and both arranged to move transversely into and out of the path of the teeth of the ratchet-wheel, a cam carried by or moving with the drive member and a wiper engaging said cam and operating to shift said ratchet-dogs, substantially as described.

24. In combination with a substantially continuously rotating driven member, means for imparting an intermittent step-by-step movement therefrom, comprising a second member mounted to rotate upon an axis concentric with the axis of rotation of the driven member, a spring yieldably connecting said members so that the driven member tends to move with the drive member, a ratchet-wheel connected to move positively with the driven member, a pair of ratchet-dogs, one fixed relatively to the forward movement of the ratchet-wheel and the other yieldable between fixed stops, limiting its movement to a distance corresponding to the distance between ratchet-teeth, and both arranged to move transversely into and out of the path of the ratchet-wheel, a helical cam arranged concentrically to and moving with the drive member, said cam having its lower and higher portions united by an abrupt drop, a wiper engaging said cam and operating to shift said ratchet-dogs, and a spring acting upon said wiper in opposition to its movement by the cam, substantially as described.

25. In combination with a substantially continuously rotating driven member, means for imparting an intermittent step-by-step movement therefrom, comprising a second member mounted to rotate upon an axis concentric with the axis of rotation of the drive member, a spring yieldably connecting said members so that the driven member tends to move with the drive member, a ratchet-wheel connected to move positively with the driven member, a pair of ratchet-dogs, one fixed relatively to the forward movement of the ratchet-wheel and the other yieldable between fixed stops, limiting its movement to a distance between ratchet-teeth, and both arranged to move transversely into and out of the path of the ratchet-wheel, a helical cam arranged concentrically to and moving with the drive member, said cam having its lower and higher portions united by an abrupt drop, a wiper engaging said cam and operating to shift said ratchet-dogs, a spring acting upon said wiper in opposition to its movement by the cam, and means for causing the driven member to move positively with the drive member, comprising a fixed stud or projection carried by the drive member and a stop or shoulder upon the driven member located in position to be engaged by the fixed projection when the drive member advances ahead of the driven member an angular distance greater than the angular distance between ratchet-teeth.

26. A longitudinally guided and movable carriage and a clock-operated type-disk mounted therein, a number-plate and a latch secured upon the carriage and adapted to engage the number-plate to secure said carriage in proper position with reference to the number-plate.

27. A longitudinally guided and movable carriage and a clock-operated type-disk mounted therein, a number-plate and operating means secured to said carriage and adapted to secure said carriage in proper position with reference to the number-plate.

JOHN W. DEÜBNER.

Witnesses:
   ALBERT H. GRAVES,
   FREDERICK C. GOODWIN.